July 17, 1956  F. T. NEWELL ET AL  2,755,111
SLEEVE TYPE PIPE COUPLING WITH THIMBLE
RESTRAINED LOCKING RING
Filed June 15, 1953  2 Sheets-Sheet 2
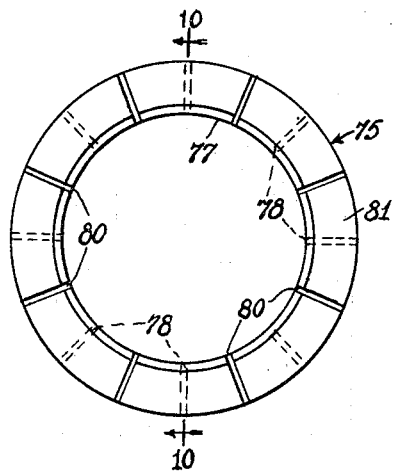
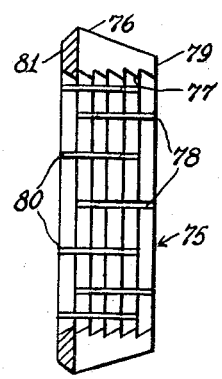
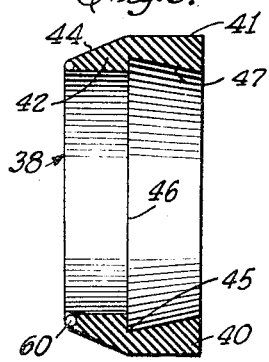
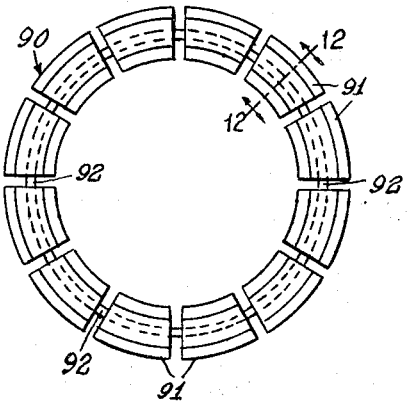
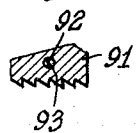
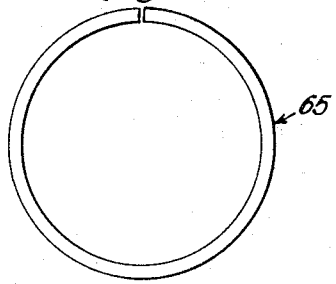
INVENTORS
ROGER E. RISLEY AND
FREDERICK T. NEWELL

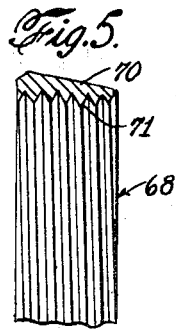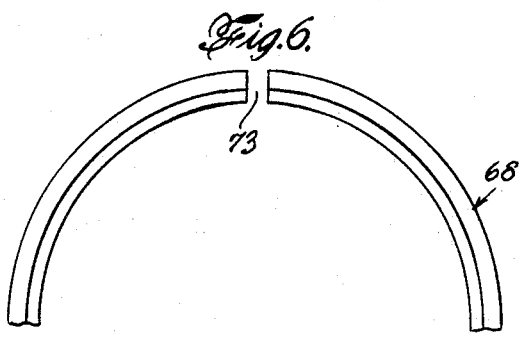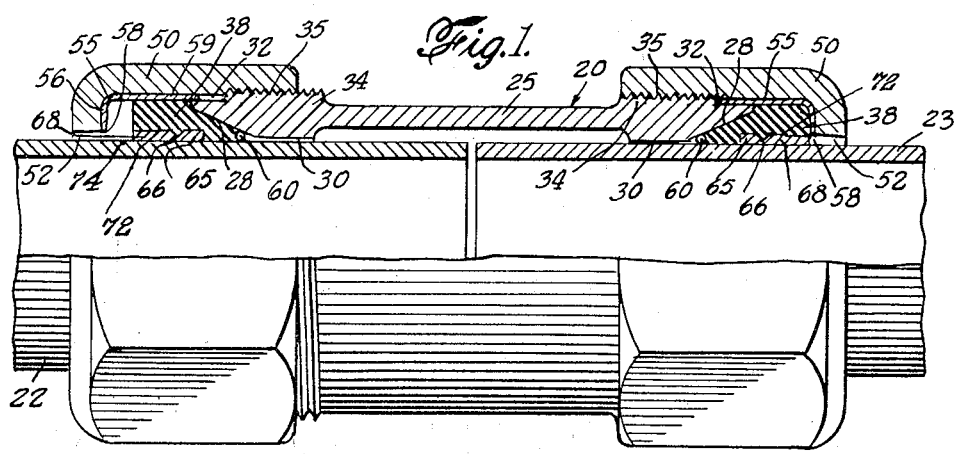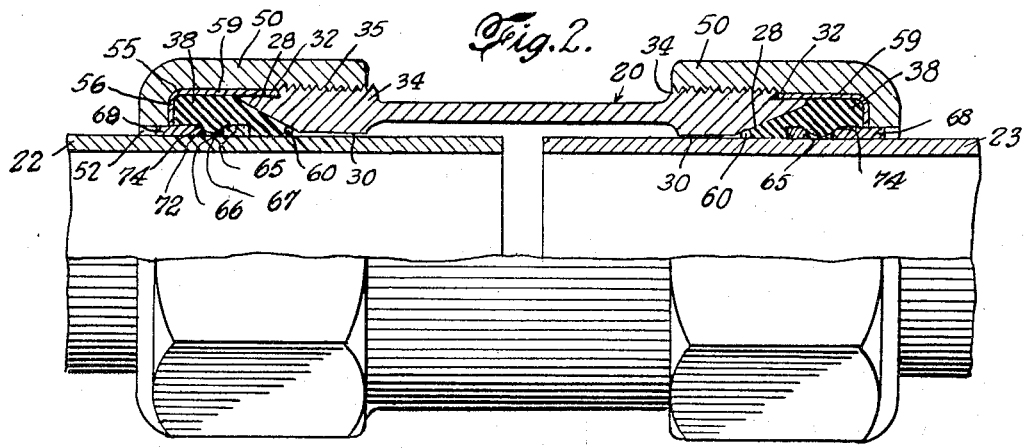

United States Patent Office 2,755,111
Patented July 17, 1956

2,755,111

SLEEVE TYPE PIPE COUPLING WITH THIMBLE RESTRAINED LOCKING RING

Frederick T. Newell and Roger E. Risley, Bradford, Pa., assignors to Dresser Industries, Inc., Dallas, Tex., a corporation of Pennsylvania Application June 15, 1953, Serial No. 361,662

3 Claims. (Cl. 285—342)

This invention relates to couplings for pipe, tubing and the like, hereinafter referred to generically as "pipe," and is more particularly concerned with couplings for connecting sections of unthreaded pipe in flexible fluid-tight relationship and effective to withstand longitudinal stress and prevent undesired outward axial displacement of the pipe sections.

In vertical pipe arrangements, such as are required in water wells and the like, which in many cases may be as much as 300 feet in depth and commonly are at least 100 to 150 feet deep, the couplings between the several sections of pipe which are required to make up the pipe line of sufficient length for such installations, must not only provide a fluid-tight joint between successive sections but must also resist the longitudinal stresses exerted by the weight of the pipe sections to prevent withdrawal of the pipes from the coupling. The heavier the pipe, of course, the greater the stress. Heretofore, for lack of more effective means, it has been common practice to join the pipe sections in such vertical pipe lines by means of ordinary screw couplings. Such couplings require the use of threaded pipe and provide a rigid, non-yielding connection. It is common knowledge that threading a pipe weakens the pipe wall by materially reducing the wall thickness along the threaded portion. It has therefore been necessary to use rather heavy pipe so that the pipe walls will have sufficient strength notwithstanding the threads. Furthermore, in order to obtain a fluid-tight connection, it is necessary that the threads be very accurately cut, which greatly adds to the time and cost of making the installation. The rigidity of the connection obtained with a screw coupling, moreover, is a disadvantage in long vertical pipe installations of this type since vibrations and flexing forces cause an undue stress on the threaded connection.

In order to avoid the aforementioned disadvantages of screw couplings and, in addition, to facilitate the assembly of the pipe lines it has been proposed to use so-called "compression type" couplings which eliminate the necessity for threading the pipe and greatly reduce the time required for assembly. In connecting pipe sections with a compression type coupling it is merely necessary to "stab" the ends of the sections into the coupling and then to tighten the gasket compressing means to squeeze the gaskets into sealing engagement with the outer surface of the pipes. A compression coupling of the type commonly used in the installation of horizontal pipe lines depends for its effectiveness upon the frictional engagement between the gaskets and the outside walls of the pipe sections. In vertical installations, however, where the weight of the line must be taken into account, this frictional engagement exerted by the gasket, while it provides a fluid-tight seal, is generally not adequate to withstand the longitudinal stresses continuously exerted by the line and, as a result, excessive outward axial movement of the pipe in the couplings occurs. The various compression type couplings heretofore proposed for vertical installations have, therefore, embodied means of one kind or another to withstand such longitudinal stresses. Such prior proposals have, however, not been entirely satisfactory since efforts to provide the necessary resistance to longitudinal stress have generally resulted in lessening the effectiveness of the gasket seal.

Some of the proposed prior constructions have, for example, been based on a locking arrangement in which the lock is frequently actuated during installation before the gaskets have been fully compressed, using the procedure normally followed in the installation of a coupling of this type. In other prior constructions, the locking elements, e. g. balls, have been of a type which are brought into locking engagement upon outward movement of the pipe sections from the coupling sleeve. In these couplings, however, the lock is sometimes not properly actuated or excessive outward movement of the pipes is necessary, and the most common disadvantage of this arrangement is that the sealing pressure of the gaskets is adversely affected during the movement of the locking elements into locking engagement. In some cases the seal is destroyed and leaking of the pipe line results.

Furthermore, many of the heretofore proposed lock couplings have involved relatively complicated constructions which make them difficult and expensive to manufacture as well as difficult to install properly, even by highly-skilled labor.

It is an object of the present invention to provide a compression type coupling for use in vertical pipe installations, and in other installations in which strong longitudinal stresses are encountered, which avoids the disadvantages and shortcomings of prior couplings designed for such use.

It is another object of the invention to provide a coupling of the character indicated wherein actuation of the locking means does not adversely affect the sealing action of the gaskets and the gaskets remain under full sealing compression.

It is a further object of the invention to provide an improved locking means for compression couplings.

It is another object of the invention to provide a cooperating gasket and locking means construction for compression couplings which insures full gasket compression upon actuation of the locking means.

It is a further object of the invention to provide a locking compression type coupling for vertical pipe installations and the like which is of relatively simple construction, economical to manufacture, and easily and effectively installed even by unskilled labor.

In accordance with the invention, there is provided a coupling comprising a central tubular sleeve or "middle ring" having externally-threaded ends, gaskets for providing a fluid-tight seal between the middle ring and the pipe sections being coupled, cooperating locking elements comprising a split metal retainer ring and a locking ring having a tapered outer peripheral surface and a serrated, pipe-engaging inner peripheral surface, and follower nuts engageable with the threaded ends of the middle ring for applying sealing pressure to the gaskets. The central apertures of the follower nuts are of sufficient diameter to receive the pipe sections and to permit partial entry of the locking ring but to prevent passage of the locking ring therethrough, and the gaskets are formed with an inner circumferential groove which is shaped to receive both the retainer ring and the serrated locking ring.

It is a feature of the invention that the split ring is held captive in the gasket groove and prevents diminution of the sealing pressure when the locking ring moves relatively to the gasket into locking engagement with the pipe.

It is another feature of the invention that upon limited outward axial movement of the pipe sections an efficient mechanical lock is effected by the locking ring to prevent further outward movement of the pipe sections without adverse affect upon the sealing action of the gaskets.

Other objects and features of the invention will be apparent from the following detailed description of illustrative embodiments of the coupling of the invention and from the accompanying drawings wherein, Fig. 1 is a longitudinal sectional view, partly in elevation, of a lock coupling embodying features of the present invention, showing the coupling at the time of installation upon a pair of co-linear pipe sections;

Fig. 2 is a similar view of the lock coupling illustrated in Fig. 1, showing the relative relationship of parts after the lock has been actuated by outward movement of the pipe sections relative to the coupling middle ring;

Fig. 3 is a vertical sectional view of the gasket shown in position in the coupling in Figs. 1 and 2;

Fig. 4 is an end elevational view of the split gasket holding ring shown in Figs. 1 and 2;

Fig. 5 is a cross-sectional view, on an enlarged scale, of the locking ring shown in Figs. 1 and 2;

Fig. 6 is a partial end elevational view of the locking ring shown in Fig. 5;

Fig. 7 is an end elevational view of a modified form of locking ring adapted for use in the lock coupling of the invention;

Fig. 8 is a sectional view taken approximately along line 8—8 of Fig. 7;

Fig. 9 is an end elevational view of another embodiment of the locking ring;

Fig. 10 is a sectional view of the locking ring shown in Fig. 9 and taken approximately along the line 10—10 of Fig. 9; and Fig. 11 is a similar sectional view of another modified form of locking ring.

Referring to the drawings, and more particularly to Figs. 1 and 2, the reference numeral 20 designates generally the locking coupling illustrated, which is shown in position around the opposed ends of pipe sections 22 and 23. Coupling 20 comprises a tubular sleeve or "middle ring" 25 having free ends which are internally tapered to provide gasket recesses 28 which extend inwardly to define pipe apertures 30 through which the pipe sections 22 and 23 are received. The outer surface of each end of sleeve 25 is formed with a cylindrical portion 32 extending from the free outer edge of the sleeve to a raised annular section 34 which is provided with external threads 35. To facilitate the description and understanding of the structure of coupling 20, reference will be made hereafter only to one end of the coupling, but it will be understood that the coupling is symmetrical and that each end is of the same construction.

Disposed in the gasket recess 28 is a gasket 38 which is annular in form, and is shaped to conform to the gasket recess 28 and the adjacent structural portions of the coupling. Thus, as shown more particularly in Fig. 3, the gasket 38 has a first or outer portion 40 with a cylindrical outer surface 41. The second or inner portion 42 of the gasket has a frusto-conical surface 44 having a slope substantially corresponding to that of the gasket recess. Interiorly, the outer portion 40 of the gasket is formed with a groove 45 having a radial wall 46 and a tapered wall 47 which slopes inwardly from the radially outer periphery of wall 46 to the outer end of the gasket. The gasket 38 is formed from rubber or rubber composition, this term being used generically to include natural and synthetic rubbers and other elastomeric compounds, or compositions having like properties and characteristics. The material is relatively firm and solid but sufficiently resilient and elastic to flow under pressure to conform to the surfaces between which it is confined. Advantageously, the gasket 38 is formed from a rubbery composition which is relatively resistant to attack by hydrocarbon gases and oils. Examples of such resistant rubbery compositions which are suitable for use are Neoprene (polychloroprene) and butadiene-acrylonitrile copolymers, such as those known commercially by the trade designations Buna-N or GR-A. The invention is, however, not limited to these specific materials, and particularly when special resistance to gases and oils is not required, any rubbery composition having the above-specified characteristics may be employed.

The gasket 38 is compressed and urged into sealing engagement between the pipe 22 and the sleeve 25 by means of a follower nut 50 which is provided with internal threads for engagement with the threads 35 of the sleeve and with a central aperture 52 of sufficient diameter to receive the pipe and part of the locking element as will be described hereinafter. In order to confine and protect the gasket 38 and to prevent frictional resistance by the gasket when the follower nut 50 is rotated in tightening or loosening the coupling, there is provided a suitable gasket retainer 55. In the embodiment illustrated in Figs. 1 and 2, the gasket retainer 55 takes the form of a substantially cup-shaped annular member conveniently stamped or otherwise formed from a metal sheet to define a body portion 56 formed with an aperture 58 substantially the size of aperture 52 of follower nut 50, and a peripheral flange 59 which is dimensioned to be received in the annular space between the follower nut and the cylindrical surface 32 of sleeve 25. When the follower nut 50 is tightened, the gasket retainer 55 is urged axially inwardly and axially compresses the gasket 38 in the gasket recess 28, thereby causing the gasket to expand radially inwardly into tight sealing engagement with the pipe.

When the follower nut 50 is tightened, as above described and as shown at the right in Fig. 1, there may in some cases be a tendency for the gasket 38 to be extruded into the interior of the sleeve 25. In order to avoid possible damage to the gasket by such extrusion, there is advantageously provided at the inner end or "toe" of the gasket, an expansible metallic ring 60. The expansible ring 60 is advantageously in the form of an annular helix which is molded into the rubber composition of the gasket by known means. The endless helix 60 is preferably imbedded in the gasket 38 so as to be substantially flush with the inner face of the gasket and also with the outer end surface 44. When the gasket is compressed by the action of the nut 50 and the gasket retainer 55, the expansible ring is forced between the face of the gasket recess 28 and the surface of the pipe and thus effectively closes the annular aperture between these adjacent surfaces.

In accordance with the invention, the necessary locking of the coupling with respect to the pipe with undiminished gasket sealing action is provided by the action of a retainer ring and a locking ring seated in the groove 45 of the gasket 38. As shown in Figs. 1 and 2, the retainer ring 65 is a split metal ring which is disposed in the groove 45 adjacent the radial wall 46, and the locking ring 68, which has a serrated inner surface, is disposed in the remainder of the gasket groove. When the gasket is compressed by the action of follower nut 50 and gasket retainer 55, an inwardly-directed, radial thrust is imposed by the gasket upon the retainer ring 65 and the locking ring 68, pressing the latter ring into strong frictional engagement with the outer surface of the adjacent pipe. The retainer ring 65 has a smooth inner surface and is of sufficient internal diameter that it is not frictionally engaged with the pipe so that it does not follow the pipe in its axial movements within the coupling. The locking ring, however, does follow the movements of the pipe and when outward axial forces are exerted upon the pipe, the locking ring is carried partly into the follower nut aperture 52 and the outer tapered surface of the locking ring engages the wall of the aperture, and the resulting wedging action presses the inner serrated surface of the ring into firmer engagement with the pipe and further outward movement of the pipe is prevented. As illustrated in Figs. 1 and 2, the outer end of face 66 of retainer ring 65 is tapered as indicated at 67. Similarly, the larger face 72 of locking ring 68 is tapered at 74 to define with retainer ring 65 an annular groove of wedge-shaped cross-section. As the locking ring moves outwardly in the gasket groove 45 upon outward movement of the pipe, the pressure on each axial side of the retainer ring is equalized so that the sealing pressure of the gasket in the gasket recess is not diminished.

It is well-known that the outside diameter of commercial pipes of any given size vary from what may be termed the "nominal" size, some pipe having a diameter greater than the nominal size and some having a lesser diameter. Thus, for each given "nominal" pipe size, the outside diameters of commercial pipes vary from what may be termed "minimum" pipe to what may be called "maximum" pipe. If pipe couplings are to be of general utility, this variation in pipe size must be taken into account. This variation has been at least partly responsible for some of the difficulties encountered in the use of many of the locking couplings heretofore proposed.

It is a feature of the invention that the lock coupling is of such construction that it may be used with maximum pipe, minimum pipe or pipe of nominal size, and in every case an effective, strong, fluid-tight connection is obtained with equal facility. In all cases, the gasket is brought smoothly into sealing engagement and the locking ring firmly locks the pipe in the coupling without adversely affecting the sealing action of the gasket.

In constructing the coupling, the various components are dimensioned to accommodate the "maximum" pipe of a given nominal pipe size. Thus, in constructing a coupling for ¾" or 1" pipe, for example, the pipe apertures 30, the gaskets 38, the expansible rings 60, the locking rings 68, the retainer rings 65, the follower nuts 50, and the gasket retainers 55, are all formed of sufficient size and with apertures of sufficient diameter to receive the maximum pipe of the specified nominal size, the latter two elements having central apertures of a size sufficient also to receive a portion of the locking ring.

The locking ring 68, as shown in the embodiment illustrated in Figs. 5 and 6, has a tapered outer surface 70 of substantially the same slope as the surface 47 of the gasket groove, and a serrated inner surface 71. The serrations may be in the form of threads or they may be parallel grooves, but in any case their edges should be sharp. In the embodiment of Figs. 5 and 6, the locking ring 68 is a split ring, its free ends being separated by a gap 73 which permits its diameter to be varied to conform to the external diameter of the pipe with which it is associated. The locking ring may, however, take various forms, i. e. it may be the split ring 68, or it may be a compressible and expansible continuous ring, or it may be discontinuous and engage only selected portions of the outer surface of the pipe. In all cases, however, the ring has a sloping outer surface and a serrated inner surface for engagement with the surface of the pipe.

Referring to Figs. 7 to 11, there are shown further illustrative embodiments of locking rings suitable for use in accordance with the invention. As shown more particularly in Figs. 7 and 8, the locking ring may be annular in form and comprise a continuous ring 75 formed with a sloping outer periphery 76 and a serrated inner periphery 77 to provide a substantially trapezoidal cross-section. The ring 75 is articulated by means of axial slots extending inwardly from each face of the ring in order to permit the ring to be conformed to the outer surface of both minimum and maximum pipe. Thus, ring 75 is provided with slots 78 extending inwardly from its smaller face 79, and slots 80 extending inwardly from its larger face 81. Slots 78 and 80 are staggered with relation to one another to divide the integral portion of ring 75 to provide a substantially regular zig-zag configuration, as clearly shown in Fig. 8. The slots 78 and 80 are shown as extending approximately five-sixths through the ring 75 but the depth of the slots may be varied. Ordinarily, however, they should extend at least two-thirds through the ring. Ring 75 for any given nominal pipe size is made with a sufficiently great internal diameter to slip over maximum pipe of the given nominal size, and the slots 78 and 80 permit the ring to be compressed inwardly to conform to the outer surface of nominal pipe or minimum pipe.

Instead of being in the form of a continuous ring, such as ring 75, or a split ring, such as ring 68, the locking ring may comprise a plurality of individual, spaced ring segments interconnected in ring form by suitable connecting and spacing means. Referring to Figs. 9 to 11, locking ring 90 illustrated is formed from a plurality of ring segments 91, each of substantially trapezoidal cross-section and having substantially trapezoidal faces interconnected into a ring by a compressible cord element 92. Cord element 92 passes through apertures 93 in segments 91 and may be a continuous helical coil or spring or may be formed from rubber or other compressible material. Fig. 11 shows an alternative method of interconnecting the segments. Segment 95 of Fig. 11 is formed with a transverse trapezoidal slot 96 in which is received a band or ring of similar cross-section and formed from rubber or other compressible composition. It will be apparent that the compressible connecting means permit the ring segments to be moved radially inwardly into locking engagement with the outer surface of the pipe with which the coupling is associated.

Furthermore, while the locking rings shown in the drawings have been referred to as having a serrated inner pipe-engaging surface, the term "serrated" is intended to include a knurled surface, or other like friction-increasing surface.

It will be understood that the invention is not limited to a coupling for two pipes of the same nominal size but may also be embodied in a reducing coupling, in a T coupling, or other coupling fitting.

The coupling of the invention is advantageously completely assembled at the time of manufacture and is thus conveniently shipped and installed with minimum effort. The locking ring and the retainer ring are seated in the groove 45 of the gasket 38, and the gasket, together with the gasket retainer 55, are positioned in the body of each follower nut. The follower nuts are then loosely engaged with the threads of the middle ring 25. When the coupling is to be applied, the pipe sections to be joined are merely "stabbed" into each open end of the coupling and the follower nuts then tightened upon the middle ring by means of a wrench or the like. As each follower nut is tightened upon the sleeve 25, the gasket 38 is compressed into sealing engagement with the pipe, the pressure of the gasket driving the locking ring into frictional engagement with the pipe, whether the pipe is "maximum" pipe, "minimum" pipe or "nominal" pipe. When an axial stress is placed on the coupling in service, the locking ring is dragged by the outwardly moving pipe into the aperture of the follower nut and the cooperative action of the sloping ring surface and the aperture wall presses the locking ring into firm locking engagement with the pipe. As a result, further outward movement of the pipe is prevented. At the same time, the retainer ring serves to prevent the release of the sealing pressure of the gasket in the gasket recess and fully effective sealing of the coupling is maintained.

There is thus provided an effective lock against longitudinal separation of the pipe sections joined by the coupling with simultaneous fluid-tight sealing of the joint. The coupling of the invention is suitable for use in connecting the sections of vertical pipe lines, such as those in wells and the like, permitting the assembly of such lines rapidly and easily without need for special tools or skilled labor, and providing a securely-joined line having fluid-tight, flexible joints which take up any vibrational or bending stresses to which the line may be subjected in service.

While the invention has been illustrated and described with reference to preferred embodiments thereof, it will be obvious that various changes and modifications in addition to those above mentioned may be made without departing from the scope of the invention as defined in the appended claims. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What we claim and desire to secure by Letters Patent is:

1. A pipe coupling comprising a tubular sleeve having a threaded end and providing an internal gasket recess, a gasket member received in said recess, said gasket member having a radial groove extending radially outwardly from its inner peripheral surface, said groove including a radial wall portion and an axially outer tapered wall portion, a retainer ring received in said groove adjacent said radial wall portion and having a substantially smooth inner peripheral surface, a locking ring received in said groove axially adjacent said retainer ring in end-abutting relation thereto, the inner peripheral surface of said locking ring being provided with serrations and the outer peripheral surface of said locking ring being planar and tapered to correspond substantially to the tapered wall portion, the adjacent radially outer edges of said locking ring and said retainer ring being partly cut away to define a surface sloping from the outer peripheries of said locking ring and said retainer ring inwardly toward the axis of said sleeve to provide a groove between the rings, and a follower member having an axial wall threadedly engageable with said sleeve and an end wall adapted to undergo axial movement when said member is tightened on said sleeve to compress said gasket member in said gasket recess, whereby to urge said gasket member into sealing engagement with said recess while simultaneously urging said locking ring radially inwardly, said follower member end wall defining a pipe-receiving aperture for receiving the pipe to be coupled, said locking ring having a first end of a given radial thickness abutting said retainer ring and a second end of lesser radial thickness than said first end, and said pipe-receiving aperture being of a diameter less than the external diameter of said first end to prevent escape of said locking ring from within said follower member upon outward axial movement of said locking ring when excessive axial stress is applied thereon.

2. A coupling as defined in claim 1, wherein a cup-shaped gasket retainer is disposed between the wall of said follower member and the gasket member to permit rotation of the follower member without frictional engagement with the gasket member.

3. A coupling as defined in claim 1, wherein said gasket member is forced into the groove formed between the locking ring and the retainer ring when said follower member is moved into tightening position thereby forming an abutment to prevent movement of said retainer ring.

References Cited in the file of this patent

UNITED STATES PATENTS

| | | |
|---|---|---|
| 2,269,695 | Scharf | Jan. 13, 1942 |
| 2,508,914 | Graham | May 23, 1950 |
| 2,613,086 | Wolfram | Oct. 7, 1952 |